United States Patent
Wang et al.

(10) Patent No.: US 12,204,028 B1
(45) Date of Patent: Jan. 21, 2025

(54) VECTORIAL ROTATION MEASUREMENT METHOD AND DEVICE BASED ON MULTI-CORE FIBER

(71) Applicant: HUAZHONG UNIVERSITY OF SCIENCE AND TECHNOLOGY, Hubei (CN)

(72) Inventors: Jian Wang, Hubei (CN); Ziyi Tang, Hubei (CN); Zhenyu Wan, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 18/827,854

(22) Filed: Sep. 9, 2024

Related U.S. Application Data (63) Continuation of application No. PCT/CN2023/138005, filed on Dec. 12, 2023.

(30) Foreign Application Priority Data

Nov. 30, 2023 (CN) .......................... 202311624909.X (51) Int. Cl.
*G01S 17/58* (2006.01)
*G01S 7/481* (2006.01)
*G01S 7/4915* (2020.01)

(52) U.S. Cl.
CPC ............ *G01S 17/58* (2013.01); *G01S 7/4818* (2013.01); *G01S 7/4915* (2013.01); *G01S 7/4812* (2013.01)

(58) Field of Classification Search
None
See application file for complete search history.

(56) References Cited

U.S. PATENT DOCUMENTS

| | | | |
|---|---|---|---|
| 11,366,203 B1 * | 6/2022 | Wood | G01S 7/4818 |
| 2022/0206124 A1 * | 6/2022 | Belsley | G01S 7/4818 |

FOREIGN PATENT DOCUMENTS

| | | |
|---|---|---|
| CN | 108036806 | 5/2018 |
| CN | 109633201 | 4/2019 |

(Continued)

OTHER PUBLICATIONS

"International Search Report (Form PCT/ISA/210) of PCT/CN2023/138005," mailed on Jun. 24, 2024, pp. 1-4.

*Primary Examiner* — Eric L Bolda
(74) *Attorney, Agent, or Firm* — JCIPRNET (57) ABSTRACT

Disclosed are a vectorial rotation velocity measurement method and device based on multi-core fiber, which belongs to the field of optical measurement. Input multiple lights are transmitted through a non-uniformly distributed space to form a structured non-uniform spatially-distributed scalar light field, wherein the scalar light field serves as a collimated probe light to illuminate rotationally moving particles, the rotationally moving particles reflect a signal light carrying motion information, the signal light is subjected to a Fourier analysis to obtain a Fourier amplitude spectrum and a Fourier phase spectrum, a velocity of the rotationally moving particles is calculated through a frequency peak in the Fourier amplitude spectrum, and a direction of the velocity of the rotationally moving particles is calculated using a relative phase difference value corresponding to the Fourier phase spectrum, thereby realizing a measurement of vectorial rotationally moving particles based on the multi-core fiber.

10 Claims, 5 Drawing Sheets

(56) References Cited

FOREIGN PATENT DOCUMENTS

| | | |
|---|---|---|
| CN | 110632585 | 12/2019 |
| CN | 110987729 | 4/2020 |
| CN | 113324879 | 8/2021 |
| CN | 115951084 | 4/2023 |
| CN | 116381272 | 7/2023 |
| WO | 2018106134 | 6/2018 |

\* cited by examiner

VECTORIAL ROTATION MEASUREMENT METHOD AND DEVICE BASED ON MULTI-CORE FIBER

CROSS-REFERENCE TO RELATED APPLICATIONS

This application is a continuation of international PCT application serial no. PCT/CN2023/138005, filed on Dec. 12, 2023, which claims the priority benefit of China application no. 202311624909.X, filed on Nov. 30, 2023. The entirety of each of the above-mentioned patent applications is hereby incorporated by reference herein and made a part of this specification.

TECHNICAL FIELD

The disclosure belongs to the field of optical measurement, and more specifically, relates to a vectorial rotation measurement method and device based on multi-core fiber.

DESCRIPTION OF RELATED ART

As it is known that the Doppler effect is caused by a relative motion between the wave source and the observer, and the Doppler effect plays a significant role in the fields of optical and acoustic measurements. Normally, techniques of Doppler velocimetry derived from the Doppler effect is characterized in the advantages of high spatial resolution, wide measurement range, and non-contact. In the history of the development of the Doppler effect, researchers often focus on the frequency changes of the light field during the interaction between the light field and an object. Recently, as researchers explore the dimensions of the light field, a vectorial Doppler effect has been disclosed and verified based on the vectorial polarization light field whose polarization changes with space. The vectorial Doppler effect serves as a brand-new extension of the conventional Doppler effect, and provides a new way to simultaneously obtain the magnitude and direction of rotationally moving velocity. However, complex devices in free space are required for this kind of vectorial polarization light field to be generated, and the polarization of the light field should be strictly controlled during the transmission, and thus such characteristic is difficult to achieve through ordinary optical fiber architecture. Considering the advantages of optical fibers for modern optical systems and the simplicity of transmitting scalar fields in optical fibers, it is necessary to find a measurement method for vector motion through scalar light fields. Typically, conventional scalar light fields only extract information about the magnitude of the velocity from motion. Objects moving in opposite rotational directions exhibit the same signal in conventional scalar light fields. For spatially asymmetric scalar light fields, signals with opposite rotation directions will produce obvious inversions in the time domain. It can be seen that the vector signal generated by the change of the rotationally moving state in the spatial asymmetric scalar light field will show extremely obvious characteristics of changes. Compared with vector light fields that rely on polarization and phase control, asymmetric scalar light fields that are only intensity-dependent make more sense on practical systems that simplify vector measurements. Such asymmetric scalar light field can be generated and transmitted by optical fiber as well, and the asymmetric scalar light field does not rely on coherent light sources and does not require strict control of the polarization of light during the transmission. In this way, it is possible to reduce the complexity of the measurement system and has a wide range of applications.

SUMMARY

In view of the shortcomings of the existing technology, the present disclosure provides a vectorial rotation velocity measurement method and device based on multi-core fiber. The purpose is to overcome the limitations of the conventional scalar light field in the measurement of vectorial rotation motion and realize the measurement of both the velocity and direction of the rotationally moving particles through the optical fiber architecture, thereby filling the technology gap.

In order to achieve the above purpose, the present disclosure provides a vectorial rotation velocity measurement method based on multi-core fiber, which includes emitting multiple lights using a light source, and the multi-core fiber is selected to excite a specific number and position of the fiber cores through a fan-in/fan-out module. The multi-core fiber then transmits a scalar light field with non-uniform spatially-distributed structure. The scalar light field is collimated by a probe, as the probe light, and illuminates the rotationally moving particles (with angular velocity $\Omega$). The rotationally moving particles reflect the signal light carrying the motion information. The signal light passes back to the probe and is converged to the specific fiber core for collection, so that the probe light and the signal light are transmitted by the same optical fiber, thereby remotely measuring the rotational motion. The detection port performs Fourier analysis on the signal light to obtain the Fourier amplitude spectrum and Fourier phase spectrum. The velocity of the rotationally moving particles is calculated through the frequency peak in the Fourier amplitude spectrum, and the direction of the velocity is calculated using the relative phase difference value corresponding to the Fourier phase spectrum, thereby realizing the measurement of vectorial rotationally moving particles based on multi-core fiber.

Preferably, in the case where the probe light is a geometry-asymmetric scalar light field, the geometry-asymmetric outer fiber cores of the multi-core fiber are selected to transmit the light under the same optical power. The generated probe light field is a non-uniform spatially-distributed scalar light field. Under the action of the scalar light field, the rotationally moving particles reflect the signal light. Fourier analysis is performed on the signal light. The first frequency peak and the second frequency peak $$\left(f_1 = \frac{\Omega}{2\pi}, f_2 = \frac{\Omega}{\pi}\right)$$

are extracted from the Fourier amplitude spectrum. The velocity $$\left(|\Delta f_{1,2}| = \frac{|\Omega|}{2\pi}\right)$$

of the rotationally moving particles can be calculated according to the frequency difference between two adjacent frequency peaks. The phase corresponding to the first frequency peak and the second frequency peak is then extracted from the Fourier phase spectrum. The relative phase difference value is calculated, and the direction of the velocity of the rotationally moving particles is determined based on the sign of the relative phase difference value.

Preferably, in the case where the probe light is an intensity-asymmetric scalar light field, the geometry-symmetric outer fiber cores of the multi-core fiber are selected to transmit the light under different optical powers. The generated probe light field is a non-uniform spatially-distributed scalar light field. Under the action of the scalar light field, the rotationally moving particles reflect the signal light. Fourier analysis is performed on the signal light. The first frequency peak and the second frequency peak $$\left(f_1 = \frac{\Omega}{2\pi}, f_2 = \frac{\Omega}{\pi}\right)$$

are extracted from the Fourier amplitude spectrum. The velocity $$\left(|\Delta f_{1,2}| = \frac{|\Omega|}{2\pi}\right)$$

of the rotationally moving particles can be calculated according to the frequency difference between two adjacent frequency peaks. The phase corresponding to the first frequency peak and the second frequency peak is then extracted from the Fourier phase spectrum. The relative phase difference value is calculated, and the direction of the velocity of the rotationally moving particles is determined based on the sign of the relative phase difference value.

Preferably, for the multi-core fiber, a specific number and position of outer fiber cores are selected to transmit the probe light, and a single central fiber core receives the signal light. There is no limitation to the length of the optical fiber. When the probe light is a geometry-asymmetric scalar light field, the number of fiber cores that transmit the light should be no less than three and form a geometry-asymmetric structure. When the probe light is an intensity-asymmetric scalar light field, the number of fiber cores that transmit the light should be no less than two. There are two ways to form a geometry-asymmetric scalar light field: first, the multi-core fiber originally has a circularly symmetrical structure fiber core distribution, and the probe light field is formed by selecting the partially asymmetric outer fiber cores to transmit light; secondly, the multi-core fiber is designed and manufactured to have a structure with asymmetric fiber core distribution, which transmits light to all outer fiber cores to form a probe light field.

Preferably, if the light source is multiple input sources, they are matched with the multi-core fiber in two ways: first, the same light source is divided into multiple homologous light beams by a beam splitter and connected to the multi-core fiber to match the number of the outer fiber cores; secondly, different light sources output light and connect to their corresponding fiber cores. In addition, the light source is not limited to the wavelength, thereby constructing a detection device that has no coherence dependence and no wavelength dependence.

According to another aspect of the present disclosure, a vectorial rotation velocity measurement device based on multi-core fiber is provided, including: a light source, a fan-in/fan-out module, a multi-core fiber, a probe, and a detection device. The light source emits multiple lights, and the fan-in/fan-out module selects to receive a specific outer fiber cores of the multi-core fiber. The multi-core fiber then transmits a structured non-uniform spatially-distributed scalar light field, and the scalar light field transmits through the probe as a probe light to illuminate the rotationally moving particles. The rotationally moving particles reflect signal light carrying motion information. The signal light is collected through the probe to the central fiber core of the multi-core fiber, thus realizing that the probe light and the signal light are transmitted by the same optical fiber, and the remote measurement of the rotationally moving is achieved. The signal light is connected to the detection device through the fan-in/fan-out module in the central fiber core. The detection device performs Fourier analysis on the signal light to obtain the Fourier amplitude spectrum and Fourier phase spectrum. The velocity of the rotationally moving particles is calculated through the frequency peak in the Fourier amplitude spectrum. The direction of the velocity is calculated using the relative phase difference value corresponding to the Fourier phase spectrum, thereby realizing vectorial rotation velocity measurement based on multi-core fibers.

Preferably, the multi-core fiber includes a ring of outer fiber cores and a central fiber core when viewed from the end face. The number of outer fiber cores that transmit the probe light matches the non-uniform illumination scheme, and the central fiber core that receives the signal light is independent therefrom. There is no limitation to the length of the multi-core fiber, and remote measurement is achieved by low-loss long optical fiber. There are two ways to form a geometry-asymmetric scalar light field: first, the multi-core fiber originally has a circularly symmetrical structure fiber core distribution, and the probe light field is formed by selecting a partially asymmetric outer fiber core to transmit light through the fan-in/fan-out module; secondly, the multi-core fiber is designed and manufactured to have a structure with asymmetric fiber core distribution, which transmits light to all outer fiber cores to form a probe light field.

Preferably, there are two ways for the light source to emit multiple lights to be received by the optical fiber: first, a single laser outputs light, and the light is divided into multiple homologous light beams by a beam splitter and connected to the multi-core fiber to match the number of specific outer fiber cores; secondly, different lasers output light beams and connect them to their corresponding fiber cores. The light source has no limitation on wavelength. In the low-loss wavelength range of multi-core fiber, a narrow linewidth laser or a wide-spectrum laser is adopted. The velocity measurement device constructed thereby has no coherence dependence and no wavelength dependence.

Preferably, in the fan-in/fan-out module, a multi-core fiber is coupled with multiple bundles of single-mode optical fibers for low loss, so that each fiber core of the multi-core fibers is controlled separately. The fan-in/fan-out module is composed of all-optical fiber components, integrated chip components, or free-space discrete components. Each fiber core contained in the multi-core fiber is connected to an independent fiber jumper. After being selected by the fan-in/fan-out module, the optical path transmitted by the multi-core fiber is divided into two types. The selected outer fiber cores transmit the light provided by the light source to form probe light, and the central fiber core collects the light returned by the rotationally moving particles to form signal light. In this way, a velocity measurement device is constructed in which probe light and signal light are transmitted in the same optical fiber.

Preferably, in the optical fiber probe device, a lens, an objective lens, a fiber collimator or a processing structure integrated on the optical fiber end face are adopted to adjust the optical path. The probe light is expanded and collimated to illuminate the rotational object to be measured. In the meantime, when the signal light is transmitted back, the signal light is converged on the central fiber core to efficiently recover information in the area covered by the probe light field.

Through the above technical solutions conceived by the present disclosure, compared with the existing technology, the present disclosure has the following advantageous effects:

1. The principle of the present disclosure is based on a structured spatially-distributed scalar light field. Compared with the general scalar field Doppler velocity measurement method, the present disclosure is innovative and has guiding significance for more general velocity measurement research. The present disclosure has broad application prospects in optical measurement, sensing and so on, and fills the technology gap.
2. The present disclosure can realize an one-time measurement of the complex rotationally moving state of particles. The present disclosure not only can obtain the rotational angular velocity of the particles, but also determine the direction of the rotational angular velocity of the particles, thus ensuring the integrity of motion information acquisition.
3. Based on multi-core fiber optic components, the present disclosure adopts a coaxial transmission structure for probe light and signal light, and integrates the detection port and the receiving end on a single probe. The remote return signal can be returned to the position of the transmitting end for detection. In this way, while reducing the cost of the measurement system, the present disclosure significantly improves the practical value of the measurement system in remote measurement.
4. The present disclosure uses an ordinary light source to input optical fiber as the probe light. There is no need to use additional reference light in the measurement, and also allows non-homogeneous light to be detected. Accordingly, the measurement device is simple and more compact while avoiding coherent noise, and the measurement results are less affected by the environment.

BRIEF DESCRIPTION OF THE DRAWINGS

FIG. 5A to FIG. 5E are diagrams showing the detection results of rotationally moving particles using a symmetrical scalar light field generated by a multi-core fiber provided by an embodiment of the present disclosure.

FIG. 6A to FIG. 6F are diagrams showing the detection results of rotationally moving particles using a geometry-asymmetric scalar light field generated by a multi-core fiber.

FIG. 7A to FIG. 7F are diagrams showing the detection results of rotationally moving particles using an intensity-asymmetric scalar light field generated by a multi-core fiber.

DESCRIPTION OF THE EMBODIMENTS

In order to make the purpose, technical solutions and advantages of the present disclosure more clear, the present disclosure will be further described in detail below with reference to the accompanying drawings and embodiments. It should be understood that the specific embodiments described here are only used to explain the present disclosure and are not intended to limit the present disclosure. In addition, the technical features involved in the various embodiments of the present disclosure described below can be combined with each other as long as they do not conflict with each other.

The disclosure provides a vectorial rotation velocity measurement method based on multi-core fiber, which includes emitting multiple lights using a light source, and the multi-core fiber selects to excite a specific number and position of the fiber cores through a fan-in/fan-out module. The multi-core fiber then transmits a structured non-uniform spatially-distributed scalar light field. The scalar light field is collimated by a probe as the probe light and illuminates the rotationally moving particles (with angular velocity $\Omega$). The rotationally moving particles reflect the signal light carrying the motion information. The signal light passes back to the probe and is converged to the specific fiber core for collection, so that the probe light and the signal light are transmitted by the same optical fiber, thereby remotely measuring the rotational motion. The detection port performs Fourier analysis on the signal light to obtain the Fourier amplitude spectrum and Fourier phase spectrum. The velocity of the rotationally moving particles is calculated through the frequency peak in the Fourier amplitude spectrum, and the direction of the velocity is calculated using the relative phase difference value corresponding to the Fourier phase spectrum, thereby realizing the measurement of vectorial rotationally moving particles based on multi-core fiber.

Specifically, in the case where the probe light is a geometry-asymmetric scalar light field, the multi-core fiber selects the geometry-asymmetric outer fiber cores to transmit the light under the same optical power. The generated probe light field is a non-uniform spatially-distributed scalar light field. Under the action of the scalar light field, the rotationally moving particles reflect the signal light. Fourier analysis is performed on the signal light. The first frequency peak and the second frequency peak $$\left(f_1 = \frac{\Omega}{2\pi}, f_2 = \frac{\Omega}{\pi}\right)$$

are extracted from the Fourier amplitude spectrum. The velocity $$\left(|\Delta f_{1,2}| = \frac{|\Omega|}{2\pi}\right)$$

of the rotationally moving particles can be calculated according to the frequency difference between two adjacent frequency peaks. The phase corresponding to the first frequency peak and the second frequency peak is then extracted from the Fourier phase spectrum. The relative phase difference value is calculated, and the direction of the velocity of the rotationally moving particles is determined based on the sign of the relative phase difference value.

Specifically, in the case where the probe light is an intensity-asymmetric scalar light field, the multi-core fiber selects the geometry-symmetric outer fiber cores to transmit the light under different optical powers. The generated probe light field is a non-uniform spatially-distributed scalar light field. Under the action of the scalar light field, the rotationally moving particles reflect the signal light. Fourier analysis is performed on the signal light. The first frequency peak and the second frequency peak $$\left(f_1 = \frac{\Omega}{2\pi}, f_2 = \frac{\Omega}{\pi}\right)$$

are extracted from the Fourier amplitude spectrum. The velocity $$\left(|\Delta f_{1,2}| = \frac{|\Omega|}{2\pi}\right)$$

of the rotationally moving particles can be calculated according to the frequency difference between two adjacent frequency peaks. The phase corresponding to the first frequency peak and the second frequency peak is then extracted from the Fourier phase spectrum. The relative phase difference value is calculated, and the direction of the velocity of the rotationally moving particles is determined based on the sign of the relative phase difference value.

Specifically, for the multi-core fiber, a specific number and position of outer fiber cores are selected to transmit the probe light, and a single central fiber core receives the signal light. There is no limitation to the length of the optical fiber. When the probe light is a geometry-asymmetric scalar light field, the number of fiber cores that transmit the light should be no less than three and form a geometry-asymmetric structure. When the probe light is an intensity-asymmetric scalar light field, the number of fiber cores that transmit the light should be no less than two. There are two ways to form a geometry-asymmetric scalar light field: first, the multi-core fiber originally has a circularly symmetrical structure fiber core distribution, and the probe light field is formed by selecting the partially asymmetric outer fiber cores to transmit light; secondly, the multi-core fiber is designed and manufactured to have a structure with asymmetric fiber core distribution, which transmits light to all outer fiber cores to form a probe light field.

Specifically, if the light source is multiple input sources, they are matched with the multi-core fiber in two ways: first, the same light source is divided into multiple homologous light beams by a beam splitter and connected to the multi-core fiber to match the number of the outer fiber cores; secondly, different light sources output light and connect to their corresponding fiber cores. In addition, the light source is not limited to the wavelength, thereby constructing a detection device that has no coherence dependence and no wavelength dependence.

According to another aspect of the present disclosure, a vectorial rotation velocity measurement device based on multi-core fiber is provided, including: a light source, a fan-in/fan-out module, a multi-core fiber, a probe, and a detection device. The light source emits multiple lights, and the fan-in/fan-out module selects to excite the specific outer fiber cores of the multi-core fiber. The multi-core fiber then transmits a structured non-uniform spatially-distributed scalar light field, and the scalar light field transmits through the probe as a probe light to illuminate the rotationally moving particles. The rotationally moving particles reflect signal light carrying motion information. The signal light is collected through the probe to the central fiber core of the multi-core fiber, thus realizing that the probe light and the signal light are transmitted by the same optical fiber, and the remote measurement of the rotationally moving is achieved. The signal light is connected to the detection device through the fan-in/fan-out module in the central fiber core. The detection device performs Fourier analysis on the signal light to obtain the Fourier amplitude spectrum and Fourier phase spectrum. The velocity of the rotationally moving particles is calculated through the frequency peak in the Fourier amplitude spectrum. The direction of the velocity is calculated using the relative phase difference value corresponding to the Fourier phase spectrum, thereby realizing vectorial rotation velocity measurement based on multi-core fibers.

Specifically, the multi-core fiber includes a ring of outer fiber cores and a central fiber core when viewed from the end face. The number of outer fiber cores that transmit the probe light matches the non-uniform illumination scheme, and the central fiber core that receives the signal light is independent therefrom. There is no limitation to the length of the multi-core fiber, and remote measurement is achieved by low-loss long optical fiber. There are two ways to form a geometry-asymmetric scalar light field: first, the multi-core fiber originally has a circularly symmetrical structure fiber core distribution, and the probe light field is formed by selecting a partially asymmetric outer fiber core to transmit light through the fan-in/fan-out module; secondly, the multi-core fiber is designed and manufactured to have a structure with asymmetric fiber core distribution, which transmits light to all outer fiber cores to form a probe light field.

Specifically, there are two ways for the light source to emit multiple lights to be received by the optical fiber: first, a single laser outputs light, and the light is divided into multiple homologous light beams by a beam splitter and connected to the multi-core fiber to match the number of specific outer fiber cores; secondly, different lasers output light beams and connect them to their corresponding fiber cores. The light source has no limitation on wavelength. In the low-loss wavelength range of multi-core fiber, a narrow linewidth laser or a wide-spectrum laser is adopted. The velocity measurement device constructed thereby has no coherence dependence and no wavelength dependence.

Specifically, in the fan-in/fan-out module, a multi-core fiber is coupled with multiple bundles of single-mode optical fibers for low loss, so that each fiber core of the multi-core fibers is controlled separately. The fan-in/fan-out module is composed of all-optical fiber components, integrated chip components, or free-space discrete components. Each fiber core contained in the multi-core fiber is connected to an independent fiber jumper. After being selected by the fan-in/fan-out module, the optical path transmitted by the multi-core fiber is divided into two types. The selected outer fiber cores transmit the light provided by the light source to form probe light, and the central fiber core collects the light returned by the rotationally moving particles to form signal light. In this way, a velocity measurement device is constructed in which probe light and signal light are transmitted in the same optical fiber.

Specifically, in the optical fiber probe device, a lens, an objective lens, a fiber collimator or a processing structure integrated on the optical fiber end face are adopted to adjust the optical path. The probe light is expanded and collimated to illuminate the rotational object to be measured. In the meantime, when the signal light is transmitted back, the signal light is converged on the central fiber core to efficiently recover information in the area covered by the probe light field.

Description will be provided below with reference to specific embodiments and drawings.

Figure 1:
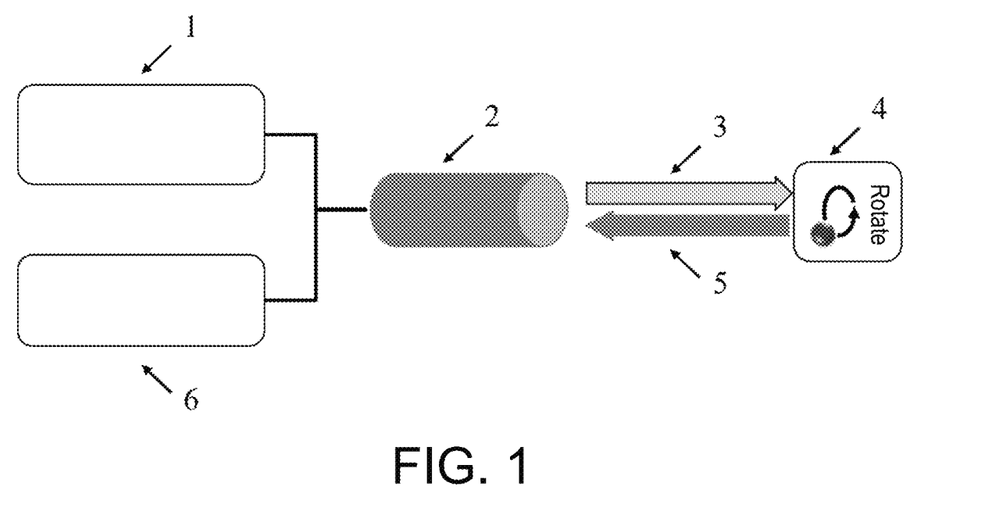
FIG. 1 is a schematic structural diagram of a vectorial rotation measurement method based on multi-core fiber provided by the present disclosure.

As shown in FIG. 1, the present disclosure provides a schematic structural diagram of a vectorial rotation measurement method based on multi-core fiber, including: a light source 1, an optical fiber device 2, a structured scalar light field 3, rotating motion particles 4, a return signal 5, and a detection device 6. The light source 1 is an ordinary light source with adjustable power, and is divided into multiple optical paths and is connected to the optical fiber device 2. The structured scalar light field 3 is generated and output through the optical fiber device 2 as probe light. The structured scalar light field 3 vertically illuminates the rotationally moving particles 4, the rotationally moving particles 4 reflect the return signal 5. The return signal 5 is collected by the optical fiber device 2, and is coaxially transmitted to the detection device 6 again through the optical fiber. The detection device 6 extracts information from the return signal 5 to realize the measurement of the velocity and direction of the rotationally moving particles 4 simultaneously. The optical axis of the structured scalar light field 3 is aligned with the rotation axis of the rotationally moving particles 4; the rotationally moving particles 4 maintain rotationally moving in the same plane, and the rotation trajectory of the rotationally moving particles is located in the structured scalar light field 3, which can reflect light fields at different spatial locations; the detection device 6 performs Fourier analysis on the return signal 5, extracts the Doppler frequency shift peak in the Fourier amplitude spectrum and the corresponding relative phase difference value in the Fourier relative phase spectrum respectively, and deduce the of rotation velocity and direction information of the rotation motion particles 4.

Figure 2:
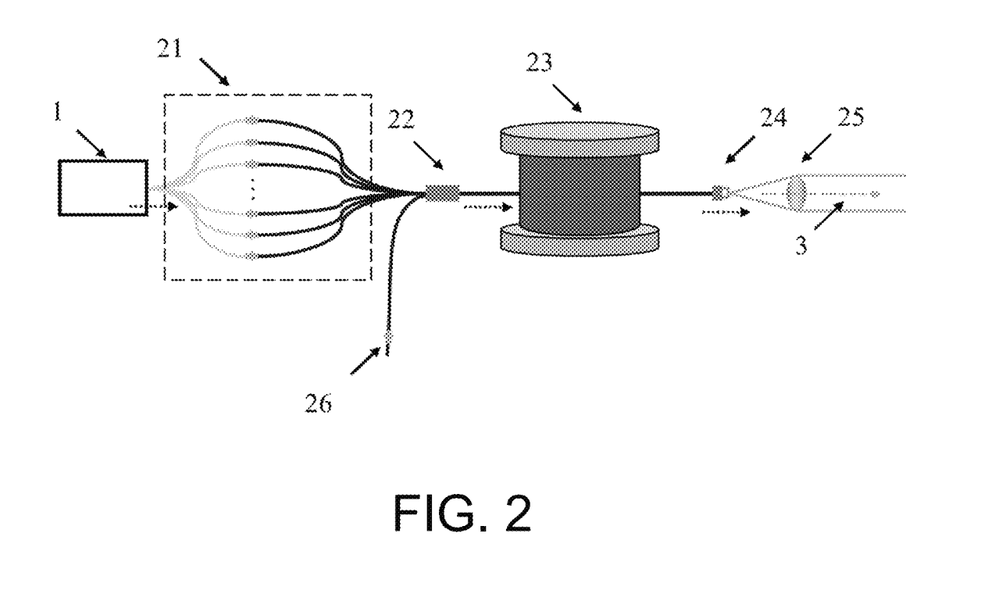
FIG. 2 is a schematic diagram of a device for generating a structured spatial scalar light field provided by an embodiment of the present disclosure.

As shown in FIG. 2, a schematic diagram of a device for generating a structured scalar light field provided by an embodiment of the present disclosure includes: a light source 1, several single-mode optical fiber ports 21 connected to the outer fiber cores, an optical fiber coupling device 22, and a multi-core fiber 23 of a certain length, a multi-core fiber output port 24, an optical fiber collimator 25, a single-mode optical fiber port 26 connected to the central fiber core, and a structured scalar light field 3. The light source 1 generates multiple lights, all of which are ordinary Gaussian beams with adjustable power. The multiple lights are connected to each of the outer fiber cores of the multi-core fiber through a number of single-mode optical fiber ports 21, and each port is coupled to the same multi-core fiber 23 by an optical fiber coupling device 22. The light is transmitted to the output port 24 through the multi-core fiber 23, and the light field output by the optical fiber then transmits through the fiber collimating lens 25 to form the structured scalar light field 3. The light source 1 only controls the power of the multiple lights without requiring polarization, and there is no requirement on the same source, that is, the light source may be provided by multiple lasers, or may be provided by a single laser through a beam splitter. The front end of the multi-core fiber 23 has a fan-in/fan-out module. Through the optical fiber coupling device 22, it is possible to achieve high-efficiency coupling between each fiber core of a multi-core fiber and several single-mode optical fibers, and each fiber core may transmit light separately. The fiber core distribution design of the multi-core fiber 23 is as follows: when viewed from the end face of the optical fiber, all outer fiber cores are distributed in a geometric circular symmetry, and a single central fiber core is located at the center of the end face. In this solution, several single-mode optical fiber ports 21 connected to the outer fiber cores are used to input light, and a single-mode optical fiber port 26 connected to the central fiber core is used to output light. By selecting whether each fiber core light source is able to transmit light, it is possible to control the generation of the required structured scalar light field 3.

Figure 3:
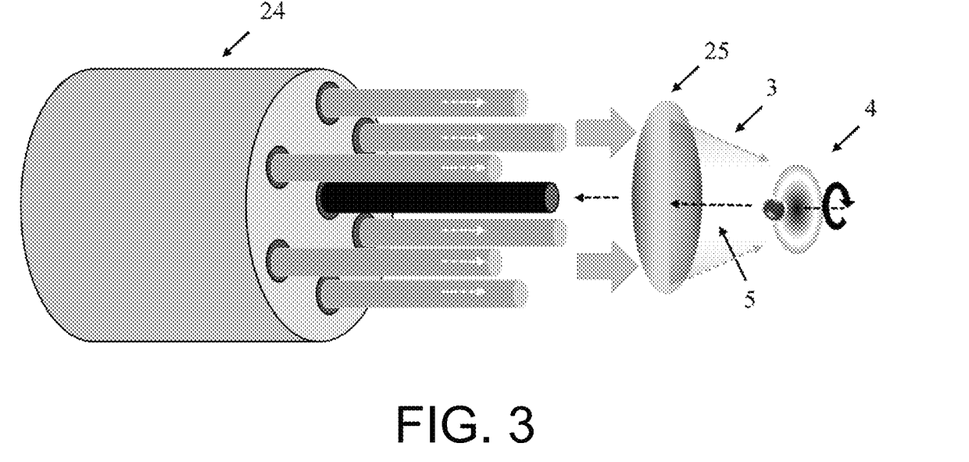
FIG. 3 is a schematic diagram of the interaction between rotationally moving particles and a structured spatial scalar light field provided by an embodiment of the present disclosure.

As shown in FIG. 3, an embodiment of the present disclosure provides a schematic diagram of the interaction between rotationally moving particles and a structured scalar light field generated by a multi-core fiber, including: a multi-core fiber output port 24, an optical fiber collimator 25, a structured scalar light field 3, rotationally moving particles 4, and a return signal 5. The multi-core fiber output port 24 outputs the light field of each of the outer fiber cores to form the structured scalar light field 3 through the optical fiber collimator 25. The rotationally moving particles 4 perform rotationally moving (angular velocity is $\Omega$). Under the illumination of the structured scalar light field 3, the revolution center of the rotationally moving particles 4 coincides with the optical axis of the structured scalar light field 3, and the motion trajectory of the rotationally moving particles 4 is located in the area with higher density of the structured scalar light field 3. The size of the rotationally moving particles 4 is smaller than the spot size of the structured scalar light field 3. During the interaction process, part of the light field is locally reflected and a signal whose intensity changes with time is generated, that is, the return signal 5.

Figure 4:
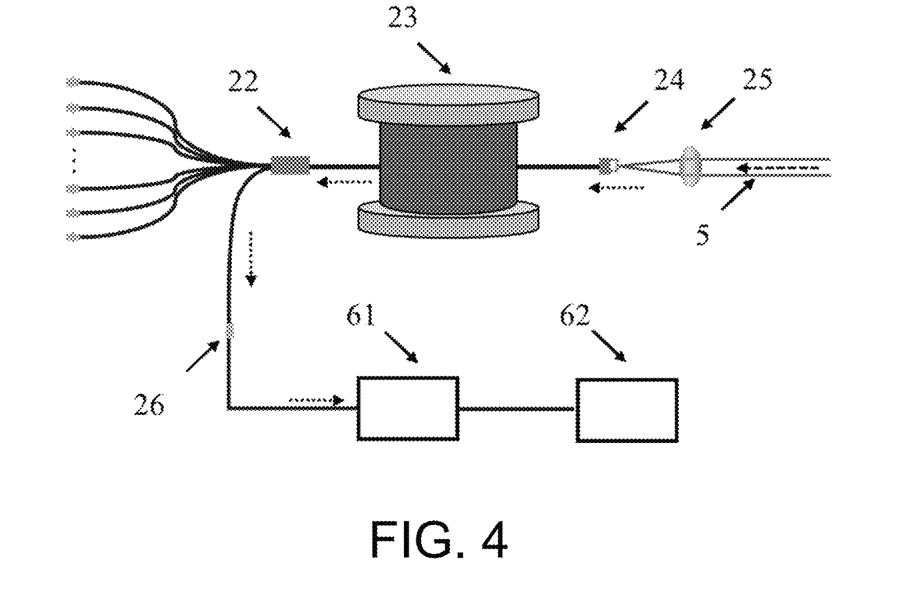
FIG. 4 is a schematic diagram of a detection device for return signals provided by an embodiment of the present disclosure.

As shown in FIG. 4, the schematic diagram of the return signal detection device provided by an embodiment of the present disclosure includes: an optical fiber coupling device 22, a multi-core fiber 23 of a certain length, a multi-core fiber output port 24, an optical fiber collimator 25, a single-mode optical fiber port 26 connected to the central fiber core, a return signal 5 to be detected, a photodetector 61, and a signal processing module 62. The return signal 5 to be detected is collected by the optical fiber collimator 25, and the returned signal light is converged to the multi-core fiber output port 24, and is received by the central fiber core of the multi-core fiber. Under the circumstances, the multi-core fiber output port 24 is a receiving port of the return signal. The return signal is transmitted through the multi-core fiber 23 and the optical fiber coupling device 22 in sequence, output by the single-mode optical fiber port 26 connected to the central fiber core, received by the photodetector 61 for photoelectric conversion, and the electrical signal converted by the photodetector 61 is transmitted to the signal processing module 62 by a radio-frequency line for Fourier analysis.

Figure 5A:
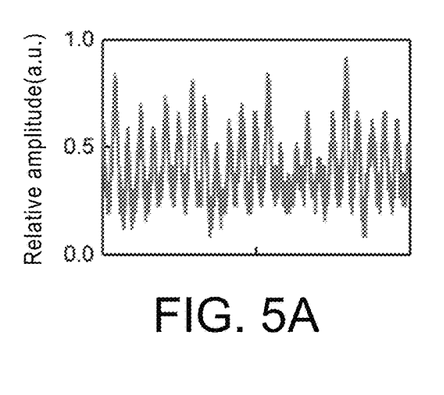
FIG. 5A shows a time domain spectrum of the echo signal detected by rotationally moving particles under a symmetric scalar light field in an embodiment of the present disclosure, wherein the rotation velocity is $\Omega=40\pi$ rad/s.
Figure 5B:
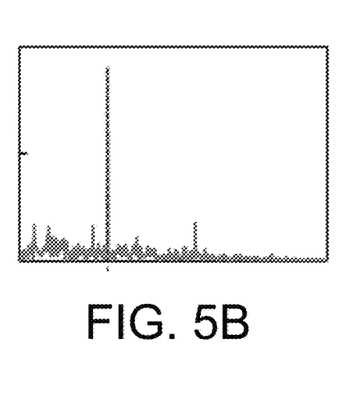
FIG. 5B shows a Fourier frequency domain spectrum of the echo signal detected by rotationally moving particles under a symmetric scalar light field in an embodiment of the present disclosure, wherein the rotation velocity is $\Omega=40\pi$ rad/s.
Figure 5C:
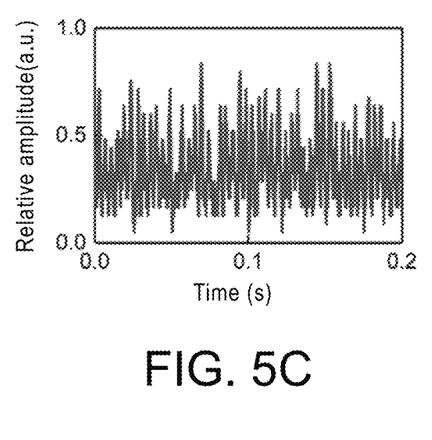
FIG. 5C shows a time domain spectrum of the echo signal detected by rotationally moving particles under a symmetric scalar light field in an embodiment of the present disclosure, wherein the rotation velocity is $\Omega=80\pi$ rad/s.
Figure 5D:
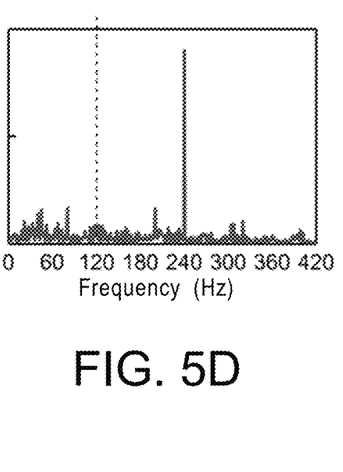
FIG. 5D shows a Fourier frequency domain spectrum of the echo signal detected by rotationally moving particles under a symmetric scalar light field in an embodiment of the present disclosure, wherein the rotation velocity is $\Omega=80\pi$ rad/s.
Figure 5E:
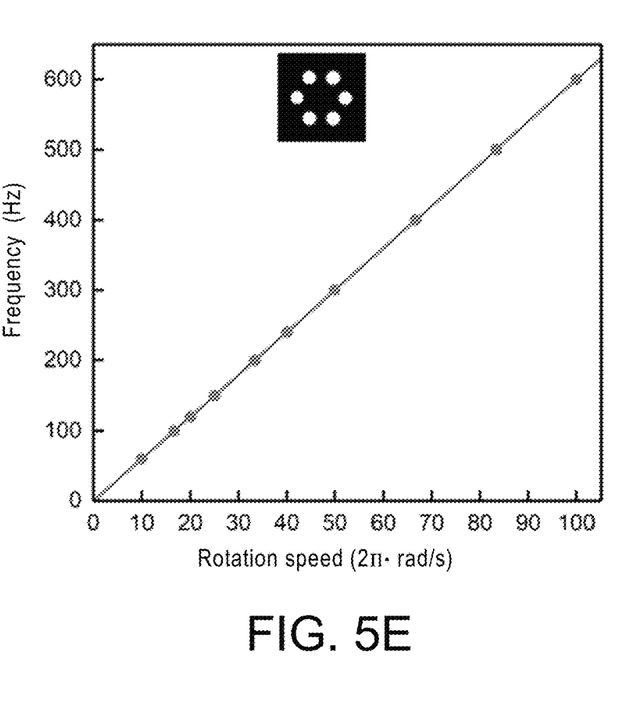
FIG. 5E shows a variable velocity measurement result obtained by detecting rotationally moving particles under a symmetrical scalar light field in an embodiment of the present disclosure.
Figure 6A:
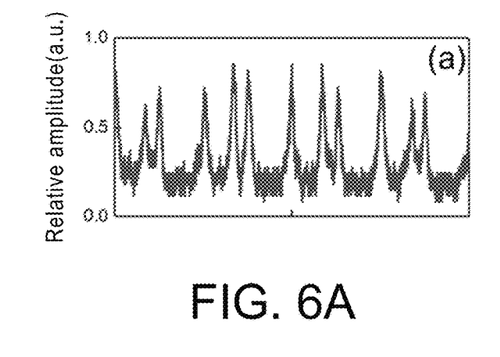
FIG. 6A shows a time domain signal of detecting counterclockwise rotationally moving particles in a geometry-asymmetric scalar light field in an embodiment of the present disclosure.
Figure 6B:
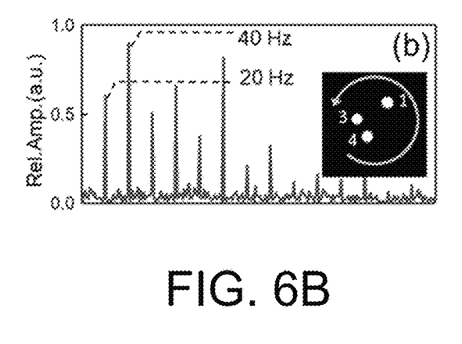
FIG. 6B shows a Fourier amplitude spectrum of detecting the counterclockwise rotationally moving particles under a geometry-asymmetric scalar light field in an embodiment of the present disclosure.
Figure 6C:
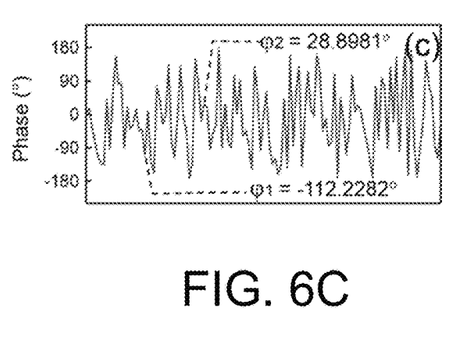
FIG. 6C shows a Fourier amplitude spectrum of detecting the counterclockwise rotationally moving particles under a geometry-asymmetric scalar light field in an embodiment of the present disclosure.
Figure 6D:
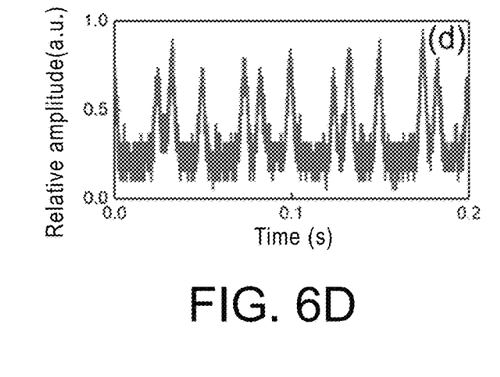
FIG. 6D shows a time domain signal for detecting clockwise rotationally moving particles under a geometry-asymmetric scalar light field in the embodiment of the present disclosure.
Figure 6E:
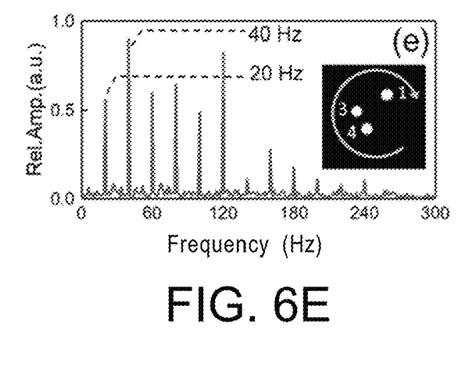
FIG. 6E shows a Fourier amplitude spectrum of detecting the clockwise rotationally moving particles under a geometry-asymmetric scalar light field in an embodiment of the present disclosure.
Figure 6F:
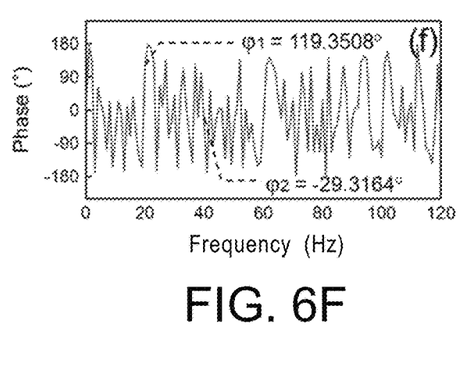
FIG. 6F shows a Fourier phase spectrum of detecting clockwise rotationally moving particles under a geometry-asymmetric scalar light field in an embodiment of the present disclosure.
Figure 7A:
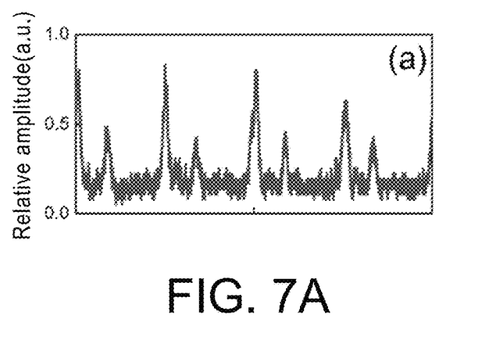
FIG. 7A shows a time domain signal for detecting counterclockwise rotationally moving particles under an intensity-asymmetric scalar light field in an embodiment of the present disclosure.
Figure 7B:
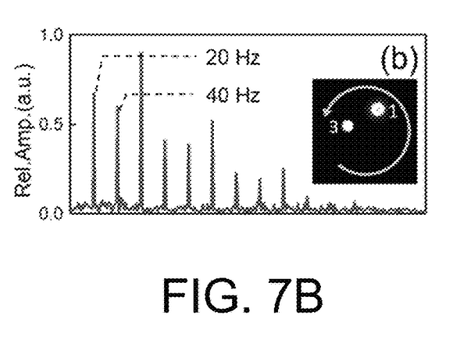
FIG. 7B shows a Fourier amplitude spectrum of detecting the counterclockwise rotationally moving particles under an intensity-asymmetric scalar light field in an embodiment of the present disclosure.
Figure 7C:
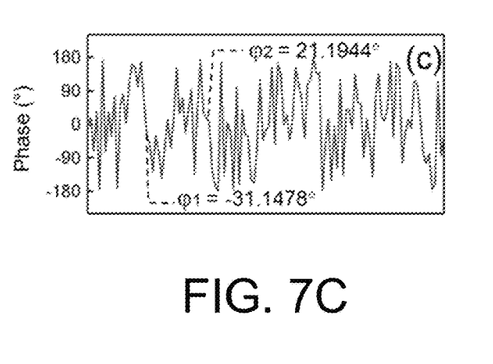
FIG. 7C shows a Fourier phase spectrum of detecting counterclockwise rotationally moving particles under an intensity-asymmetric scalar light field in an embodiment of the present disclosure.
Figure 7D:
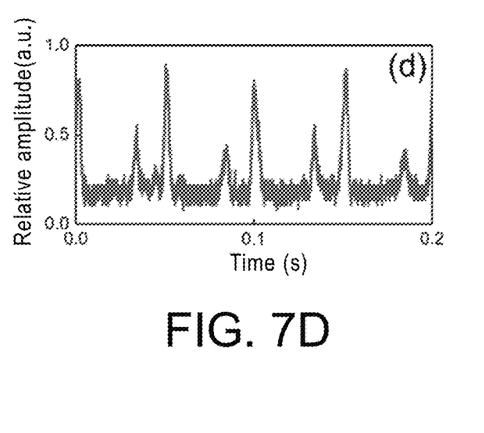
FIG. 7D shows a time domain signal for detecting clockwise rotationally moving particles under an intensity-asymmetric scalar light field in an embodiment of the present disclosure.
Figure 7E:
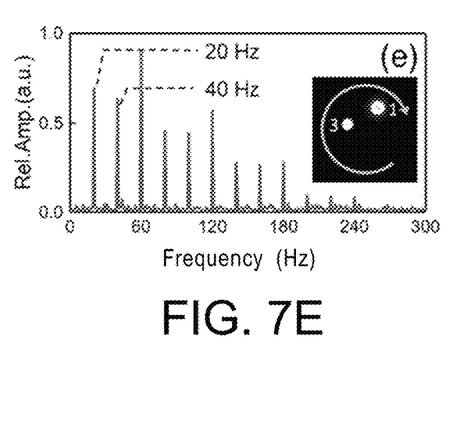
FIG. 7E shows a Fourier amplitude spectrum of detecting the clockwise rotationally moving particles under an intensity-asymmetric scalar light field in an embodiment of the present disclosure.
Figure 7F:
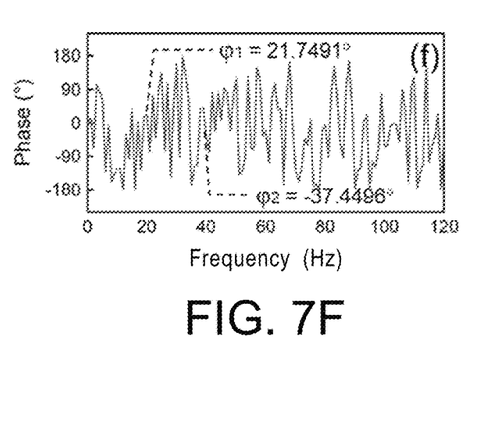
FIG. 7F shows a Fourier phase spectrum of detecting the clockwise rotationally moving particles under an intensity-asymmetric scalar light field in an embodiment of the present disclosure.

As shown in FIG. 5A to FIG. 5E, the multi-core fiber provided by an embodiment of the present disclosure generates a symmetrical scalar light field to detect the rotationally moving particles. When the rotation velocity of the rotationally moving particles is $\Omega=40\pi$ rad/s, FIG. 5A shows the detected time domain signal, and FIG. 5B shows the detected Fourier amplitude spectrum; when the rotation velocity of the rotationally moving particles is $\Omega=80\pi$ rad/s, FIG. 5C shows the detected time domain signal, and FIG. 5D shows the detected Fourier amplitude spectrum; FIG. 5E shows a variable velocity measurement result, showing the linear relationship between the detected signal frequency and rotation velocity. The probe light used in this result is a symmetrical light field. For a seven-core optical fiber, six circularly symmetric outer cores are selected to transmit the light and the optical power is controlled to be the same. The rotational symmetry of the symmetrical scalar light field is $S_R=6$. As shown in FIG. 6A to FIG. 6F, the multi-core fiber generates a geometry-asymmetric scalar light field to detect rotationally moving particles. When the rotation velocity of the rotationally moving particles is $\Omega=40\pi$ rad/s with counterclockwise rotation direction, FIG. 6A shows the detected time domain signal, FIG. 6B shows the detected Fourier amplitude spectrum, and FIG. 6C shows the detected Fourier phase spectrum; when the rotation velocity of the rotationally moving particles is $\Omega=40\pi$ rad/s with the clockwise rotation direction, FIG. 6D shows the detected time domain signal, FIG. 6E shows the detected Fourier amplitude spectrum, and FIG. 6F shows the detected Fourier phase spectrum. The probe light used in this result is a geometry-asymmetric light field. For a seven-core optical fiber, three asymmetric outer fiber cores are selected to transmit light and the optical power is controlled to be the same. FIG. 7A to FIG. 7F are diagrams showing the detection results of rotationally moving particles using an intensity-asymmetric scalar light field generated by a multi-core fiber. When the rotation velocity of the rotationally moving particles is $\Omega=40\pi$ rad/s with the counter-clockwise rotation direction, FIG. 7A shows the detected time domain signal, FIG. 7B shows the detected Fourier amplitude spectrum, and FIG. 7C shows the detected Fourier phase spectrum. In the case where the rotation velocity of the rotationally moving particles is $\Omega=40\pi$ rad/s with clockwise rotation direction FIG. 7D shows the detected time domain signal, FIG. 7E shows the detected Fourier amplitude spectrum, and FIG. 7F shows the detected Fourier phase spectrum. The probe light used in this result is an intensity-asymmetric light field, which is formed by selecting two symmetrical outer fiber cores of a seven-core optical fiber to transmit light under different controlled optical power. It can be seen from the measurement results of the symmetric scalar light field that the rotational symmetry of the symmetric scalar light field is $S_R=6$. When the rotation velocity doubles, the peak frequency of the Fourier amplitude spectrum will also double. The peak frequency has a linear relationship $$f_{mod} = \frac{S_R \cdot \Omega}{2\pi}$$

with the rotation velocity.

Regarding the measurement results of the asymmetric scalar light field, regardless of whether the probe light field is a geometric asymmetric scalar light field or an intensity-asymmetric scalar light field, under a fixed rotation velocity of particles, the detected Fourier amplitude spectrum has several peak frequencies, wherein $|f_1|$ and $|f_2|$ are the first peak frequency and the second peak frequency respectively, and $|\Delta f_{1,2}|$, which is the difference between $|f_1|$ and $|f_2|$, is associated with the rotation angular velocity. According to the difference in Fourier relative phase spectrum under the two rotation directions in FIG. 6C and FIG. 6F, it can be seen that when the anisotropic rotation motion reverses the direction, the sign of the relative phase difference corresponding to the two peak frequencies is reversed, based on which it is possible to determine the sign of the two peak frequencies. Using the relationship between the interval between the two peak frequencies and the rotation angular velocity, the angular velocity and direction of the rotationally moving particles may be calculated. Similarly, according to the difference in Fourier relative phase spectrum under the two rotation directions in FIG. 7C and FIG. 7F, it can be seen that when the anisotropic rotation motion reverses the direction, the sign of the relative phase difference corresponding to the two peak frequencies is reversed, based on which it is also possible to calculate the angular velocity and direction of the rotationally moving particles.

The present disclosure is not limited to the above-mentioned specific embodiments. Those skilled in the art may adopt various other specific embodiments to implement the present disclosure based on the disclosure of the present disclosure. Therefore, any design that adopts the design structure and ideas of the present disclosure with some simple changes or modifications falls within the scope to be protected by the present disclosure.

What is claimed is:

1. A vectorial rotation velocity measurement method based on multi-core fiber, comprising:

transmitting input multiple lights through a non-uniformly distributed space to form a scalar light field with non-uniform spatially-distributed structure, wherein the scalar light field serves as a probe light to collimate and illuminate rotationally moving particles; the rotationally moving particles reflect a signal light carrying motion information; the signal light is subjected to a Fourier analysis to obtain a Fourier amplitude spectrum and a Fourier phase spectrum; a velocity of the rotationally moving particles is calculated through a frequency peak in the Fourier amplitude spectrum, and a direction of the velocity of the rotationally moving particles is calculated using a relative phase difference value corresponding to the Fourier phase spectrum, thereby realizing a measurement of vectorial rotationally moving particles based on the multi-core fiber.

2. The velocity measurement method according to claim 1, wherein first two frequency peaks are taken in an ascending order of peak frequency as follows: a first frequency peak and a second frequency peak, and the peak frequencies are respectively as follows:

the first frequency peak:

$$f_1 = \frac{\Omega}{2\pi}$$

the second frequency peak:

$$f_2 = \frac{\Omega}{\pi}$$

wherein $\Omega$ is an angular velocity of the rotationally moving particles, two peak frequencies are subtracted from each other to obtain $$|\Delta f_{1,2}| = \frac{|\Omega|}{2\pi},$$

and a moving velocity of the rotationally moving particles is calculated.

3. The velocity measurement method according to claim 2, wherein a phase $\varphi_1$ corresponding to the first frequency peak and a phase $\varphi_2$ corresponding to the second frequency peak are obtained from the Fourier phase spectrum, and a relative phase difference value $\Delta\varphi_{2,1}=\varphi_2-\varphi_1$ between the first frequency peak and the second frequency peak is calculated, the direction of the velocity of the rotationally moving particles is determined according to a sign of the relative phase difference.

4. A vectorial rotation velocity measurement device based on multi-core fiber, comprising: a light source, a fan-in/fan-out module, a multi-core fiber, a probe, and a detection device; wherein the light source is configured to emit multiple lights, and the fan-in/fan-out module selects to receive a specific outer fiber cores of the multi-core fiber to generate a structured non-uniform spatially-distributed scalar light field, the multi-core fiber is configured to transmit the scalar light field, and the scalar light field transmits through the probe as a probe light to illuminate a rotationally moving particle, the rotationally moving particle reflect a signal light carrying motion information, the signal light is collected through the probe to a central fiber core of the multi-core fiber, the signal light is then connected to the detection device through the fan-in/fan-out module, the detection device performs a Fourier analysis on the signal light to obtain a Fourier amplitude spectrum and a Fourier phase spectrum, a velocity of the rotationally moving particles is calculated through a frequency peak in the Fourier amplitude spectrum, a direction of the velocity of the rotationally moving particles is calculated using a relative phase difference value corresponding to the Fourier phase spectrum, thereby realizing a measurement of vectorial rotation velocity based on the multi-core fiber.

5. The rotation velocity measurement device according to claim 4, wherein the multi-core fiber comprises: the central fiber core disposed at a center of the multi-core fiber; outer fiber cores disposed in a circle around the central fiber core, and distances between each of the outer fiber cores and the central fiber core are equal, and distances between each of the outer fiber cores are equal; there is no crosstalk or weak crosstalk in an energy transmitted between the central fiber core and any of the outer fiber cores, and between each of the outer fiber cores; the fan-in/fan-out module selects the partially asymmetric outer fiber cores to transmit light to form a probe light field.

6. The rotation velocity measurement device according to claim 4, wherein the multi-core fiber comprises: the central fiber core disposed at a center of the multi-core fiber; outer fiber cores disposed around the central fiber core, and distances between each of the outer ring fiber cores and the central fiber core and between each of the outer fiber cores are not equal, there is no crosstalk or weak crosstalk in an energy transmitted between the central fiber core and any of the outer fiber cores, and between each of the outer fiber cores; the fan-in/fan-out module selects all of the outer fiber cores to transmit light to form a probe light field.

7. The rotation velocity measurement device according to claim 4, wherein the scalar light field is a geometry-asymmetric light field, an optical power provided to fiber core is uniform, and the outer fiber cores that transmit light is asymmetric in spatial geometric distribution.

8. The rotation velocity measurement device according to claim 4, wherein the scalar light field is an intensity-asymmetric light field, and an optical power provided to fiber cores is non-uniform, the outer fiber cores that transmit light is an asymmetric in spatial intensity distribution, and has other forms except of being axial symmetry along a diameter of a fiber end face in terms of the spatial intensity distribution.

9. The rotation velocity measurement device according to claim 4, wherein the light source is a single laser, which outputs multiple identical homologous lights through beam splitting, formed multiple lights are connected to the multi-core fiber, and the number of the multiple lights matches the number of the outer fiber cores that transmit the light.

10. The rotation velocity measurement device according to claim 4, wherein the light source is a plurality of lasers, and a plurality of output lights form multiple lights are connected to the multi-core fiber, and the number of the multiple lights matches the number of the outer fiber cores that transmit the light.

* * * * *